United States Patent
Ge

(10) Patent No.: US 10,077,093 B2
(45) Date of Patent: Sep. 18, 2018

(54) COLLAPSIBLE CONNECTED CRANK HAVING INTERNAL PRESSURE SPRINGS

(71) Applicant: Jiangsu Baiyee Sports Equipment Technology Co., Ltd, Zhenjiang City, Jiangsu Province (CN)

(72) Inventor: Zhi-Feng Ge, Zhenjiang (CN)

(73) Assignee: Jiangsu Baiyee Sports Equipment Technology Co., Ltd., Zhenjiang, Jiangsu Province (CN)

( * ) Notice: Subject to any disclaimer, the term of this patent is extended or adjusted under 35 U.S.C. 154(b) by 0 days.

(21) Appl. No.: 15/650,029

(22) Filed: Jul. 14, 2017

(65) Prior Publication Data

US 2018/0162485 A1  Jun. 14, 2018

(30) Foreign Application Priority Data

Dec. 9, 2016 (CN) ..................... 2016 2 1348450 U

(51) Int. Cl.
*B62M 3/00* (2006.01)
*B62M 3/02* (2006.01)

(52) U.S. Cl.
CPC ................ *B62M 3/00* (2013.01); *B62M 3/02* (2013.01); *B62M 2003/006* (2013.01)

(58) Field of Classification Search
CPC ..... B62M 3/00; B62M 2003/006; B62M 3/02
USPC ..................................... 74/594.1, 594.4, 600
See application file for complete search history.

(56) References Cited

U.S. PATENT DOCUMENTS

| 2004/0007089 A1* | 1/2004 | Fan | B62K 15/00 74/594.1 |
| 2017/0233035 A1* | 8/2017 | Tong | B62M 3/16 74/594.1 |

\* cited by examiner

*Primary Examiner* — David H Bollinger
(74) *Attorney, Agent, or Firm* — Muncy, Geissler, Olds & Lowe, P.C.

(57) ABSTRACT

The present invention includes two rotatable sleeves, two springs, two pins, two plastic sleeves and a Z-shaped crank. The two springs are respectively disposed in the two rotatable sleeves. The two rotatable sleeves are respectively accommodated around corresponding left end and right end of the crank. One end of each of the two springs is abuttingly connected on an inner wall of one of the two rotatable sleeves and one other end abuttingly connected on an end wall of the crank. The two pins are respectively penetrated through the two rotatable sleeves and are insertingly connected on the crank. The two plastic sleeves are respectively accommodated around left and right ends of the crank to closely cover the two pins. Thus, the present invention not only provides a smooth and pleasant appearance, but also allows a pedal to a position parallel to a bicycle without affecting a boxing effect.

5 Claims, 3 Drawing Sheets

US 10,077,093 B2

COLLAPSIBLE CONNECTED CRANK HAVING INTERNAL PRESSURE SPRINGS

FIELD OF THE INVENTION

The present invention relates to a collapsible connected crank having internal pressure springs.

BACKGROUND OF THE INVENTION

The manufacturing of connected cranks has long inherited conventional appearance designs and craft. With respect to an installation position of a pedal, a position at an end of a crank is flattened, drilled and tapped to manufacture pedal holes having tooth patterns (½*20). As such, when a bicycle is completely assembled and boxed, pedals cannot be directly installed, otherwise the pedals will protrude from two sides of an outer box accommodating the bicycle, hence affecting the boxing process and the overall outer appearance and volume of a carton container. The pedals are then assembled by a client or a specialist after the client purchases the bicycle. Further, a risk of an assembly failure at the client end may be caused due to defective tooth patterns.

Therefore, there is a need for a solution for improving prior art to solve the issues of the prior art.

SUMMARY OF THE INVENTION

It is an object of the present invention to provide a collapsible connected crank having internal pressure springs to solve the issues of the prior art.

According to a technical solution of the present invention, a collapsible connected crank having internal pressure springs includes two rotatable sleeves, two springs, two pins, two plastic sleeves and a Z-shaped crank. The two springs are respectively disposed in the two rotatable sleeves. The two springs are respectively accommodated at corresponding left and right ends of the crank. One end of each of the two springs is abuttingly connected on an inner wall of one of the two rotatable sleeves and the other end abuttingly connected on an end wall of the crank. The two pins are respectively penetrated through the two rotatable sleeves, and are insertingly connected on the crank. The two rotatable sleeves respectively pass through elastic forces of the two springs to become abuttingly connected on the two pins. Further, the two plastic sleeves are respectively accommodated around left and right ends of the crank to abut closely against the two pins.

An accommodating cavity for accommodating the spring is disposed in an axial direction of the rotatable sleeve. On a sidewall of the rotatable sleeve, a first arc positioning hole, a second arc positioning hole and a rotation groove that are all in communication with the accommodating cavity are disposed. The first arc positioning hole and the second arc positioning hole are respectively in communication with two ends of the rotation groove. Further, an axis of the first arc positioning hole is perpendicular to an axis of the second arc positioning hole.

Further, an upper end of the rotatable sleeve is provided with a rectangular connection edge, which is provided with a threaded connection hole.

Further, each of two ends of the crank is provided with a pin hole.

Further, the pin hole is an elastic open pin.

The present invention achieves following effects. The present invention has a simple structure, which is easy to use and manufactured at low costs, such that a manufacturer of a bicycle may install pedals in advance in the factory. With the rotatable adjustment provided by the rotatable sleeves, the pedals may be adjusted to positions parallel to the bicycle, without effect a boxing effect. To put to application, the rotatable sleeves can be rotated to allow the pedals become perpendicular to the bicycle.

DETAILED DESCRIPTION OF THE PREFERRED EMBODIMENTS

Details of the present invention are given with the accompanying drawings below.

Figure 1:
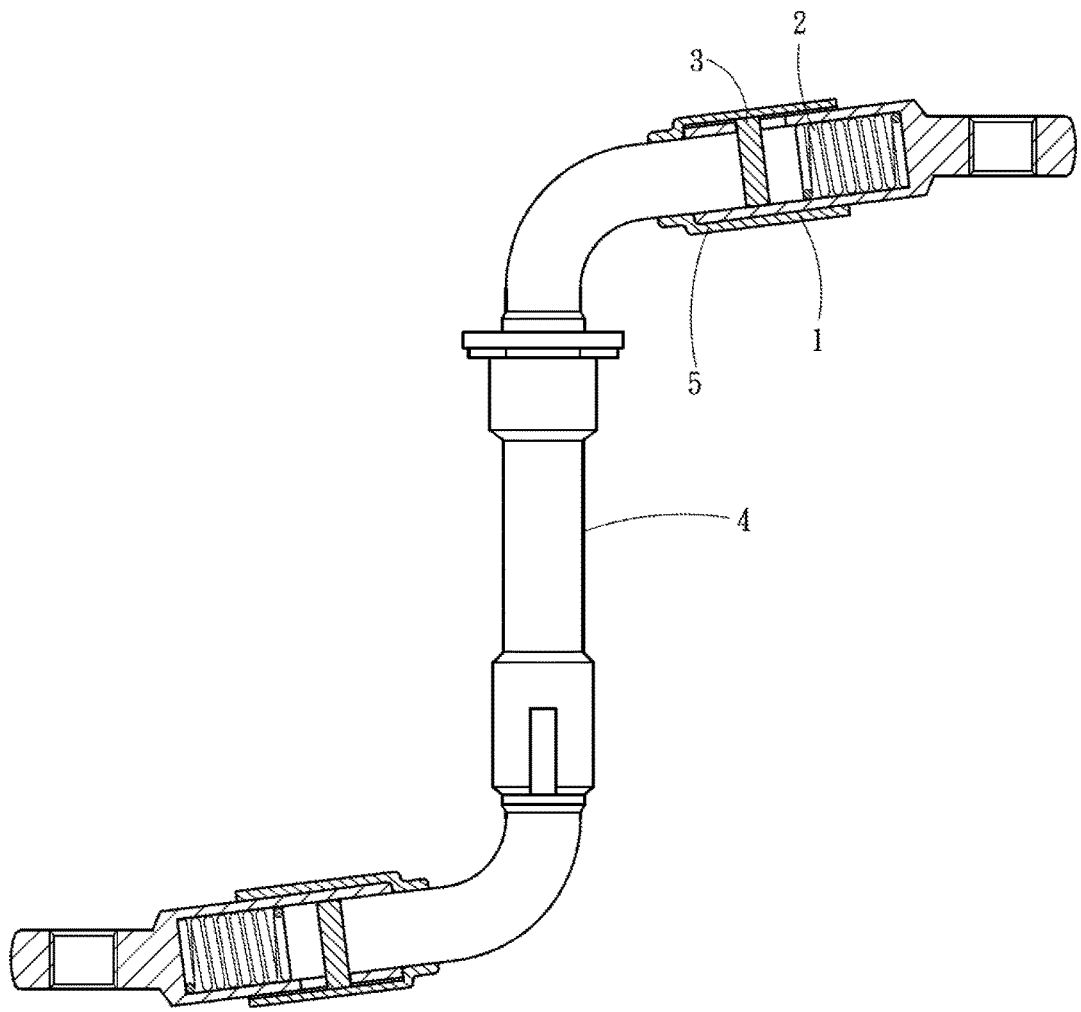
FIG. 1 is a structural diagram of the present invention.
Figure 2:
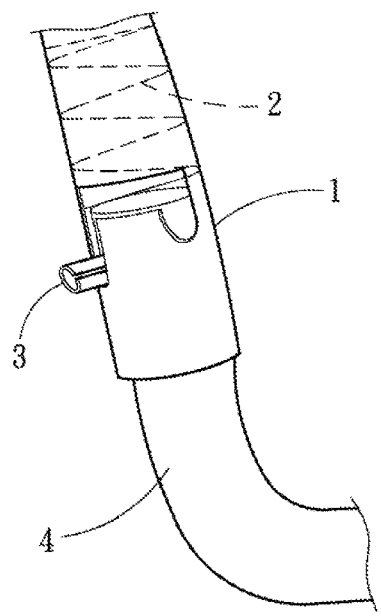
FIG. 2 is an enlarged partial view of a rotatable sleeve on a crank of the present invention.
Figure 3:
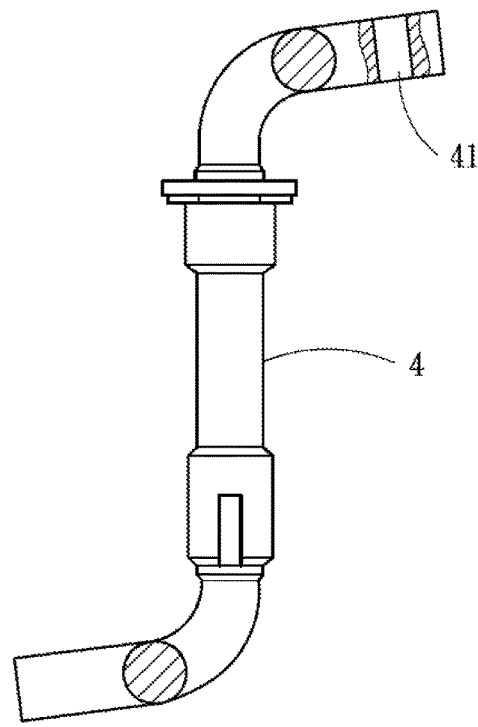
FIG. 3 is a structural diagram of a crank of the present invention.
Figure 4:
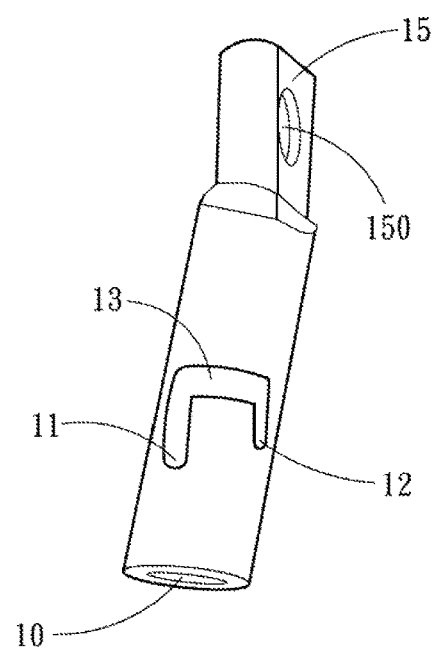
FIG. 4 is a three-dimensional structural diagram of a rotatable sleeve on a crank of the present invention.
Figure 5:
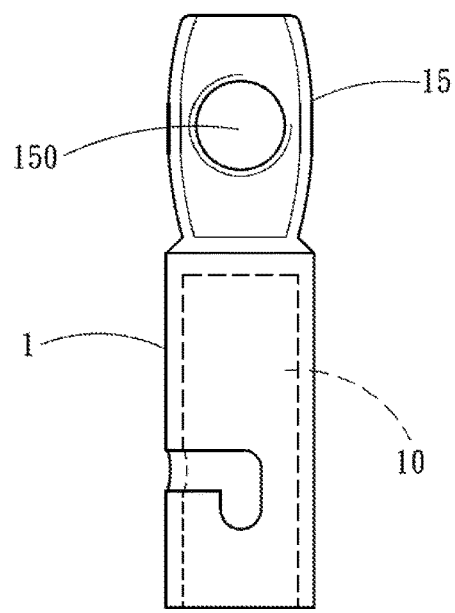
FIG. 5 is a planar structural diagram of a rotatable sleeve on a crank of the present invention.

As shown in FIG. 1 to FIG. 5, a collapsible connected crank having internal pressure springs of the present invention includes two rotatable sleeves 1, two springs 2, two pins 3, a Z-shaped crank 4 and two plastic sleeves 5. The two springs 2 are respectively disposed in the two rotatable sleeves 1. The two rotatable sleeves 1 are respectively accommodated around two corresponding ends, a left end and a right end, of the crank 4. Further, one end of each of the two springs 2 is abuttingly connected on an inner wall of one of the two rotatable sleeves 1, and the other end abuttingly connected on one end wall of the crank 4. The two pins 3 are respectively penetrated through the two rotatable sleeves 1, and are insertingly connected on the crank 4. The two rotatable sleeves 1 respectively pass through elastic forces of the two springs 2 and are abuttingly connected on the two pins 3. The two plastic sleeves 5 are respectively accommodated around the left and right ends of the crank 4, and closely cover the two pins 3.

In the present invention, an accommodating cavity 10 is disposed in an axial direction of the rotatable sleeve 1. The spring 2 is disposed in the accommodating cavity 10, and has its one end abuttingly connected on an inner wall of the accommodating cavity 10. On a sidewall of the rotatable sleeve 1, a first arc positioning hole 11, a second arc positioning hole 12 and a rotation groove 13 that are all in communication with the accommodating cavity 10 are disposed. The shape of the rotation groove 13 may be one selected from a U shape and an L shape, and a U shape is depicted in the drawing as an example. The first arc positioning hole 11 and the second arc positioning hole 12 are respectively in communication with two ends of the rotation groove 13.

An axis of the first arc positioning hole 11 is perpendicular to an axis of the second arc positioning hole 12.

To better install a pedal of a bicycle to the rotatable sleeve 1, a rectangular connection edge 15 is provided at an upper end of the rotatable sleeve 1, and a threaded connection hole 150 is provided on the connection edge 15.

To better insert and connect the pin 3 on the crank 4, a pin hole 41 is provided at each of two ends of the crank 4. In the present invention, the pin 3 is an elastic open pin that provides reliable positioning effect and tightening force.

Application steps of the present invention are as follows.

1) The plastic sleeve 5 is accommodated around the left end or right end to a bent position, and is drawn as close as possible towards an upper part to facilitate installation at a lower part of the crank 4.

2) An outer pedal is thread connected in the threaded connection hole 150 on the rotatable sleeve 1.

3) The spring 2 is disposed in the accommodating cavity 10 of the rotatable sleeve 1, the rotatable sleeve 1 is accommodated around the corresponding left end or right end of the crank 4, and one end of the spring 2 is caused to be abuttingly connected on the inner wall of the accommodating cavity 10 and the other end of the spring 2 is caused to be abuttingly connected on the crank 4.

4) The rotatable sleeve 1 on the crank 4 is pressed downwards in a way that the spring 2 is compressed, and overcomes the elastic force to move downwards. The rotatable sleeve 1 is no longer pressed once the pin hole 41 on the crank 4 is revealed. The pin 3 is penetrated through the rotation groove 13 on the rotatable sleeve 1 and becomes insertingly connected in the pin hole 41. The rotatable sleeve 1 is released and the spring 2 rebounds. Under the effect of the elastic force of the spring 2, the first arc positioning hole 11 of the rotatable sleeve 1 becomes abuttingly connected on the pin hole 41.

5) The plastic sleeve 5 previously accommodated around the upper part above the bent position of the crank 4 is sleeved downwards in a leveled manner to envelop a rotatable collapsible part and caused to closely abut against the pin 3, thereby achieving effects of providing a pleasant appearance and preventing the pin 3 from disengaging. At this point, the pedal on the rotatable sleeve 1 is parallel to a body of the bicycle, and boxing can be carried out with ease.

6) To put to application, the plastic sleeve 5 is first removed, and the rotatable sleeve 1 is pressed downwards and rotated by 90 degrees. The rotatable sleeve 1 is then released to allow the spring 2 to rebound. Under the effect of the elastic force of the spring 2, the second arc positioning hole 12 of the rotatable sleeve 1 is abuttingly connected on the pin hole 41. At this point, the pedal on the rotatable sleeve 1 is perpendicular to the body of the bicycle.

Preferred but non-limiting embodiments of the present invention are as described above. It should be noted that, without departing from the principle of the present invention, appropriate modifications may be made by one person having ordinary skill in the art. These modifications made are also to be encompassed within the scope of the present invention.

What is claimed is:

1. A collapsible connected crank having internal pressure springs, comprising:

two rotatable sleeves, two springs, two pins, two plastic sleeves and a Z-shaped crank;

wherein, the two plastic sleeves are respectively accommodated at upper parts of a bent position at a left end and a right end of the crank in advance, the two springs are respectively disposed in the two rotatable sleeves, the two rotatable sleeves are respectively accommodated around the corresponding left end and right end of the crank, one end of each of the two springs is abuttingly connected on an inner wall of one of the two rotatable sleeves and one other end abuttingly connected on an end wall of the crank, the two pins are respectively penetrated through the two rotatable sleeves and insertingly connected on the crank, and the two rotatable sleeves pass through elastic forces of the two springs and are abuttingly connected on the pins; and an accommodating cavity is disposed in an axial direction of the rotatable sleeve, a first arc positioning hole, a second arc positioning hole and a rotation groove that are all in communication with the accommodating cavity are disposed on a sidewall of the rotatable sleeve, the first arc positioning hole and the second arc positioning hole are respectively in communication with two ends of the rotation groove, and an axis of the first arc positioning hole is perpendicular to an axis of the second arc positioning hole.

2. The collapsible connected crank having internal pressure springs of claim 1, wherein an upper end of the rotatable sleeve is provided with a rectangular connection edge, and a threaded connection hole is provided on the connection edge.

3. The collapsible connected crank having internal pressure springs of claim 1, wherein each of two ends of the crank is provided with a pin hole.

4. The collapsible connected crank having internal pressure springs of claim 1, wherein the pin is an elastic open pin.

5. The collapsible connected crank having internal pressure springs of claim 1, wherein a shape of the rotation groove is one selected from a U shape and an L shape.

* * * * *